(12) United States Patent
Konno et al.

(10) Patent No.: US 8,852,314 B2
(45) Date of Patent: Oct. 7, 2014

(54) METHOD OF PRODUCING MAGNETIC POWDER FOR MAGNETIC RECORDING MEDIUM

(75) Inventors: Shinichi Konno, Honjo (JP); Kenichi Inoue, Hirosaki (JP); Toshihiko Ueyama, Okayama (JP); Kenji Masada, Okayama (JP); Shinya Sasaki, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 339 days.

(21) Appl. No.: 13/039,604

(22) Filed: Mar. 3, 2011

(65) Prior Publication Data

US 2011/0147642 A1 Jun. 23, 2011

Related U.S. Application Data

(63) Continuation of application No. 11/249,411, filed on Oct. 14, 2005, now abandoned.

(51) Int. Cl.
| | | |
|---|---|---|
| *B22F 9/20* | (2006.01) | |
| *G11B 5/712* | (2006.01) | |
| *G11B 5/706* | (2006.01) | |
| *H01F 1/06* | (2006.01) | |
| *G11B 5/714* | (2006.01) | |

(52) U.S. Cl.
CPC .............. *G11B 5/70621* (2013.01); *B22F 9/20* (2013.01); *G11B 5/70615* (2013.01); *G11B 5/714* (2013.01); *H01F 1/065* (2013.01)
USPC ........................................... 75/348; 148/105

(58) Field of Classification Search
None
See application file for complete search history.

(56) References Cited

U.S. PATENT DOCUMENTS

| | | | |
|---|---|---|---|
| 5,480,716 A * | 1/1996 | Naoe et al. ................... | 428/328 |
| 6,544,673 B1 | 4/2003 | Okinaka et al. | |
| 6,589,701 B2 * | 7/2003 | Yamazaki et al. ......... | 430/106.2 |
| 2003/0168129 A1 * | 9/2003 | Matsumoto et al. .......... | 148/301 |

FOREIGN PATENT DOCUMENTS

| | | |
|---|---|---|
| JP | 5-144618 | 6/1993 |
| JP | 2001-237115 | 8/2001 |
| JP | 2001-313207 | 11/2001 |
| JP | 2002-367142 | 12/2002 |
| JP | 2003-059707 | 2/2003 |
| JP | 2003-119503 | 4/2003 |
| JP | 2004-013975 | 1/2004 |

\* cited by examiner

*Primary Examiner* — George Wyszomierski
(74) *Attorney, Agent, or Firm* — Clark & Brody

(57) ABSTRACT

A magnetic powder for magnetic recording medium comprises acicular particles constituted primarily of Fe, wherein the powder contains Co in an amount such that the Co/Fe ratio is 50 at. % or less and the Co is contained in a manner such that the surface portion has a higher concentration than the core portion of the particles, and upon subjecting the magnetic powder for magnetic recording medium to TG measurement, the powder exhibits at least two oxidation starting points: a low-temperature side oxidation starting point and a high-temperature side oxidation starting point. The magnetic powder achieves improved resistance to oxidation without sacrificing magnetic characteristics.

4 Claims, 2 Drawing Sheets

METHOD OF PRODUCING MAGNETIC POWDER FOR MAGNETIC RECORDING MEDIUM

This application is a continuation of application Ser. No. 11/249,411, filed Oct. 14, 2005, now abandoned.

BACKGROUND OF THE INVENTION

1. Field of the Invention

The present invention relates to a magnetic powder for use in magnetic recording medium, and particularly to a magnetic powder for use in magnetic recording medium that is suitable for constituting the upper recording layer of multi-layer coated-type magnetic recording medium.

2. Background Art

Magnetic recording medium such as tape for home audiovisual equipment and storage tape for data backup have been the subjects of attempts to improve electromagnetic conversion characteristics with the object of increasing the recording density and improving picture quality. With conventional general-use coated-type magnetic recording material, it has been preferable to use magnetic powder with as small of particle size as possible to increase the recording density, and to this end, attempts to reduce the particle sizes are now being done at a rapid pace.

As recited in the various literatures, the typical procedure for preparing metal magnetic powder is to grow iron carbonate or iron hydroxide in water through the use of an aqueous solution of ferrous salts and carbonic acid or an alkaline hydroxide or both. Air or another oxidizing gas is blown through the aqua-dispersion of this precursor to generate iron oxy-hydroxide, and the acicular iron oxy-hydroxide thus obtained is used as the raw material that goes through the dehydration and reduction processes to produce the metal magnetic particles or so-called "metal powder."

However, it is known that as the particle size becomes smaller, the surface activity of the metal magnetic powder becomes extremely high and if oxygen is present in the handling atmosphere, oxidation will proceed rapidly, leading to marked deterioration in magnetic characteristics.

Improving the stability of this metal powder with respect to oxidation, or namely improving its weatherability, is a problem directly related to the storage stability of the magnetic recording medium itself, so it has been studied energetically from diverse angles. For example, there have been studies focused on the ignition temperature using TG/DTA to increase oxidation resistance by defining these values as disclosed in JP2003-59707A (Patent Document 1), studies focused on changes in different oxidation atmospheres to study high-temperature oxidation stability as disclosed in JP2002-367142A (Patent Document 2), studies focusing on the x-ray diffraction intensity before and after an oxidation reaction to study the chemical composition as disclosed in JP2001-313207A and JP2004-13975A (Patent Documents 3 and 4), studies of the chemical composition of the oxide layer covering the surfaces of the particles as disclosed in JP2001-237115A (Patent Document 5), studies of covering the surface with a substance that gives oxidation resistance as disclosed in JP5-144618A (Patent Document 6), studies of optimizing the thickness of the oxide layer covering the surfaces of the particles as disclosed in JP2003-119503A (Patent Document 7) and the like.

In their studies in regard to reducing the particle size and improving the oxidation resistance of the metal powder, the present inventors found that it is difficult to discuss oxidation stability by merely studying the results of thermogravimetric (TG)/differential thermal analysis(DTA), referred to TG/DTA, and ignition temperatures. Namely, even if the ignition temperature is high, the oxidation resistance may not necessarily be good. In addition, while the thickness of the oxide layer of the particles can be adjusted by varying the oxidation time, if the layer is made thicker, the volume of the magnetic core will become smaller, resulting in problems such as poor magnetic characteristics. Changing the chemical composition of the oxide layer of the particles may require the addition of different types of metal, but the addition of different types of metal may work effectively in improving the oxidation resistance of the magnetic powder, but also lead to problems where the medium characteristics deteriorate when it is made into recording medium, or in certain cases, there may be problems with waste fluid arising at the time of manufacture, so the financial burden may increase since existing disposal facilities may be inadequate, thus requiring new investment.

Accordingly, it is an object of the present invention to obtain a magnetic powder for magnetic recording medium that is both resistant to oxidation and has good magnetic characteristics, and to thus provide magnetic recording medium with improved reliability.

SUMMARY OF THE INVENTION

With the present invention, these technical problems can be solved by a magnetic powder for magnetic recording medium comprising acicular particles constituted primarily of Fe, wherein, upon subjecting the magnetic powder for magnetic recording medium to thermogravimetric (TG) measurement, the powder exhibits at least two oxidation starting points: a low-temperature side oxidation starting point and a high-temperature side oxidation starting point; here, TG measurement is the measurement of the weight change of a 10 mg sample of powder in air when the temperature is raised at a heating rate of 10° C./minute.

In this magnetic powder, the relationship between the low-temperature side oxidation starting point [called the apparent ignition temperature $(IT_{(i)})$] and the high-temperature side oxidation starting point [called the actual ignition temperature $(IT_{(ii)})$] is as follows:

$$IT_{(ii)-IT(i)} < 10° C. \quad (1)$$

In addition, the weight gain in the TG measurement from the start of measurement until 300° C. is 10 wt. % or greater. Furthermore, the drop in saturation magnetization $\Delta\sigma_s$ when stored for one week under constant temperature and constant humidity at a temperature of 60° C. and humidity of 90% RH is less than 15%; provided that when the saturation magnetization prior to the storage under constant temperature and constant humidity is given as $\sigma_{s(i)}$ and the saturation magnetization after one week of storage under said condition is given as $\sigma_{s(ii)}$, $\Delta\sigma_s$ is defined as:

$$\Delta\sigma_s = 100 \times [\sigma_{s(i)} - \sigma_{s(ii)}]/\sigma_{s(i)}.$$

This magnetic powder contains Co in an amount such that the Co/Fe ratio is 50 at. % or less and the Co is contained in a manner such that the surface portion has a higher concentration than the core portion of the particles.

DESCRIPTION OF THE PREFERRED EMBODIMENT

Figure 1:
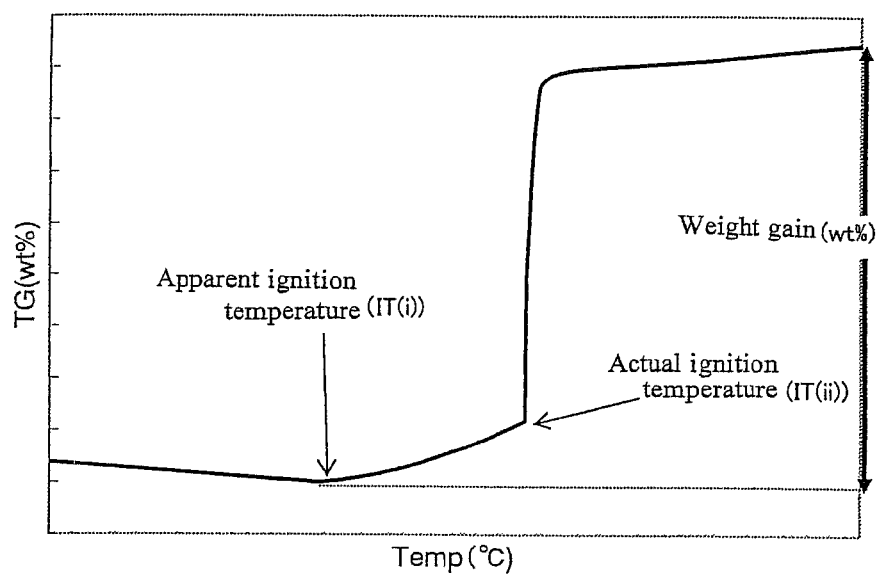
FIG. 1 is a diagram used to describe the terms used in the profile (TG curve) obtained in TG measurement.

With a metal powder constituted primarily of Fe, it is possible to optimize the amount of Co added in order to achieve both resistance to oxidation and good magnetic characteristics. Particularly in such metal powders wherein the average length of the major axis is less than 0.1 μm, it was found that if Co is added in an amount such that the Co/Fe ratio is 50 at. % or less and the Co is contained in a manner such that the surface portion has a higher concentration than the core portion, the oxidation resistance can be increased while maintaining good magnetic characteristics.

If the surface portion has a higher Co concentration than the core portion, this means that Co is present in relatively larger amounts near the surface of the particle in comparison with its overall content, and specifically, the measured value of the Co content in the surface layer of the particle would be higher than the value calculated as the Co composition value in the particle interior (and thus the ratio of the former surface Co content to the latter overall Co content is greater than 1). The Co content in the surface layers can be measured by ESCA, and the Co content in the particle composition can be measured using ICP or fluorescent x-ray spectroscopy or the like. When this metal powder is subjected to thermogravimetric (TG) measurement wherein the weight change of a 10 mg sample of powder in air is measured when the temperature is raised at a heating rate of 10° C./minute, the powder exhibits at least two oxidation starting points: a low-temperature side oxidation starting point and a high-temperature side oxidation starting point. In other words, the weight gain curve in TG measurement has two different slopes.

When cobalt is present in relatively large amounts near the surface in this manner, this can suppress the rapid progress of oxidation. In addition, by doing so, it was found that the oxidation resistance level can be substantially increased even while suppressing the temperature level at the time of stabilization process, and thus oxidation resistance equal to or better than when a strong, thick oxide layer is formed on the surface can be obtained. For this reason, in comparison with the prior art wherein oxidation stability had been obtained by sacrificing magnetic characteristics in order to increase the ignition temperature, it is possible to suppress the excess formation of the oxide layer, so it is possible to obtain magnetic powder that keeps its magnetic characteristics.

Here follows a description of the features that characterize the present invention.

The acicular metal powder constituted primarily of Fe according to the present invention is characterized in that its surface portion contains relatively large amounts of other metal components. To describe this for Co in particular, in order to improve the oxidation resistance and magnetic characteristics of the powder, it contains Co in an amount such that the atom percent abundance relative to Fe, or namely the Co/Fe atomic ratio, is 50 at. % or less, or preferably 2-45 at. %. If the Co content is less than 2 at. %, this object will not be attained, but if greater than 50 at. %, its effect becomes saturated, so the Co content is set in this range. The present invention is also characterized in that the Co is contained in the particles in a manner such that Co is present in a higher concentration in the surface portion than the core portion of the particles.

By so controlling the manner in which the Co is contained, at least two oxidation starting points appear when this metal powder is subjected to TG measurement, and this was found to allow its oxidation resistance to be greatly increased even with fine particle such as not more than 200 nm, preferably not more than 100 nm of its major axis.

As an example of the magnetic powder according to the present invention, we shall describe an example of obtaining an acicular iron alloy magnetic powder from iron oxy-hydroxide. In this case, iron oxy-hydroxide is first produced as a precursor material.

Examples of methods of producing iron oxy-hydroxide include the method of adding ferrous salts to an aqueous carbonate solution to produce iron carbonate (an alkaline hydroxide can also be co-used at this time), passing an oxygen-containing gas through this solution to induce an oxidation reaction and thus form iron oxy-hydroxide, the method of producing iron oxy-hydroxide by the reaction of ferrous salts and an alkaline hydroxide, and the method of adding an oxidizing agent to a suspension of iron carbonate to produce iron oxy-hydroxide. Among these methods, in the case of using an alkaline hydroxide, an iron oxy-hydroxide with high acicularity is produced, but when iron carbonate is the intermediate, particles in the shape of a cylinder that is pointed at both ends (a spindle shape) are readily obtained, and depending on the case, flat acicular particles may also be obtained by appropriately adjusting the conditions.

In order to obtain particles of magnetic iron alloy that contain comparatively large amounts of cobalt at the particle surface, a method wherein cobalt is added to the solution in the intermediate or final oxidation step of the above iron oxy-hydroxide process, or added later, is appropriate. The cobalt concentration in the particle surface layers can also be increased by changing the rate of addition of cobalt or the form in which it is added (by forming a complex or the like). As a different method, a method of adhering cobalt to the iron oxy-hydroxide thus produced presents no particular problems. At this time, the portion equivalent to the nucleus of the original particle may also contain cobalt.

The Co content of the entire particle, when expressed as an atom percent abundance (at. %) of Fe, or namely the Co/Fe ratio, is 50 at. % or less, or preferably 2-45 at. %, or more preferably 10-40 at. %. Under conditions when the Co content is in this range, by adjusting the distribution such that Co is present relatively abundantly in the particle surface in comparison with the core portion, it is possible to improve the saturation magnetization, coercivity and oxidation resistance with a good balance of attributes.

The magnetic particles according to the present invention may also contain Al in addition to Co. Aluminum can be added to improve the wear resistance of the magnetic powder and to obtain a sinter-prevention effect, and to improve dispersion with respect to the binder. The Al content required for this is an Al/(Fe+Co) ratio of 50 at. % or less, or preferably 1-40 at. %, or more preferably 2-30 at. %. If the Al content is excessive, then while the particle hardness increases, the fraction of nonmagnetic components in the particle increases so that a drop in the magnetic characteristics such as the saturation magnetization is seen, so the addition of excessive amounts of Al is not preferable. The timing of the addition of aluminum should be at the initial stages of the formation of the iron oxy-hydroxide. Were large amounts of aluminum to be added at the beginning, the acicularity can no longer be maintained. Thus the Al is preferably added from the iron oxy-hydroxide growth stage until the stage when oxidation is complete.

With regard to other components, other than those that are unavoidable in production, those component elements intended to improve magnetic characteristics and dispersion into the binder may also be included. For example, appropriate amounts of Si, Zn, Cu, Ti, Ni and the like may be included. However, these elements should be added in amounts appropriate to the characteristics required of the particles, since they may disturb the balance of magnetic characteristics and the like if added in large amounts.

The rare-earth elements (defined as including Y) have the effect of preventing sintering during the dehydration and the reduction under heating of iron oxy-hydroxide and are also effective in improving the particle size distribution. Thus, they are preferably added for this reason, but if added, when R is used to represent the rare-earth elements including Y, the R/(Fe+Co) ratio should be 25 at. % or less, or preferably 1-20 at. %, or more preferably 2-15 at. %. The addition of excessive R, like Al, is not preferable because the saturation magnetization drops markedly. Examples of appropriate rare-earth elements include Y, Gd, Yb, La and Sc (scandium). In the experience of the present inventors, the greater the atomic weight of the rare-earth, the more suitable magnetic characteristics it was found to exhibit in the low-$\sigma_s$ domain. As regards the timing of the addition of R, it may be added during the iron oxy-hydroxide growth stage to form a solid solution, or it may be added after growth is complete and thus adhered.

At least after the iron oxy-hydroxide containing cobalt is obtained, the iron oxy-hydroxide slurry should be filtered, rinsed and processed such that uniform heat is applied, and thus dried for six hours or more at 80-300° C., or preferably 120-250° C., or more preferably 150-220° C. in an inert gas or air. Thereby, dried, solid iron oxy-hydroxide is obtained, and then the cobalt-containing iron oxy-hydroxide is heated and dehydrated in nitrogen under temperature conditions of 250-700° C. and thus converted to $\alpha$-$Fe_2O_3$ or other iron oxides. During this heating and dehydration, the atmosphere is not required to be free of water vapor, oxygen, carbon dioxide or other gases.

Next, the iron oxides thus obtained are reduced by gas-phase reduction. Examples of the reducing gases include carbon monoxide, acetylene, hydrogen and others. This reduction can be performed using multi-stage reduction wherein the reduction temperature is changed between the first-stage reduction and the second-stage reduction. Multi-stage reduction is a type wherein reduction is initially performed while keeping the temperature relatively low and then reduction is performed while keeping the temperature high after a temperature increase. During this reduction also, the atmosphere is not required to be free of water vapor or carbon dioxide.

The alloy powder obtained after reduction is extremely active, so there is a risk of ignition if handled in air as is. To solve this problem, it is preferable for a dense oxide layer to be formed on the surface of the particles in a slow oxidation step so that it can be handled in air. In order to form a dense oxide layer on the surface after the aforementioned reduction process, it is preferably cooled to an arbitrary temperature in the range 50-200° C., and a weakly oxidizing gas, or a gas containing an appropriate amount of oxygen in an inert gas, is introduced to form a stable oxide layer. At this time, carbon dioxide, water vapor or other gases may also be present.

When the magnetic powder thus obtained is subjected to TG measurement, or specifically when it is subjected to TG measurement wherein the weight-increase profile of a 10 mg sample is measured in air while the temperature is raised at a heating rate of 10° C./minute, the curve at that time has characteristic inflection points until the sample is completely oxidized. In this case, the magnetic powder is both resistant to oxidation and has good magnetic characteristics, and this powder can be used to obtain coated-type magnetic recording medium with superior storage stability.

Referring to the case in which the particles contain Co, when this curve has two or more inflection points caused by the cobalt being concentrated in the surface layers of the particles, the powder was found to be both resistant to oxidation and have good magnetic characteristics. The cobalt content in the particle surface layers can be measured by ESCA, and the cobalt content in the particle composition can be measured using ICP or fluorescent x-ray spectroscopy or the like. When the ratio (surface Co content measured by ESCA)/(internal Co content measured by ICP or fluorescent x-ray spectroscopy) is greater than 1, the oxidation resistance is improved in comparison with when this ratio is less than or equal to 1. When this ratio is 1, this means that cobalt is uniformly distributed within the particle, so the TG curve in this case has only a single inflection point, and thus the oxidation resistance is inferior to that in which the curve has at least two deflection points in accordance with the present invention. In addition, if this ratio is smaller than 1, this means that oxygen is present in greater abundance on the particle surface, or namely a thick oxide layer is present, so in this case, while the oxidation resistance is improved, it is difficult to obtain a powder with good magnetic characteristics.

With the magnetic powder according to the present invention, this ratio being greater than 1 means that even after the surface is oxidized to form an oxide layer in the slow oxidation step after the final reduction in the production of this powder, this ratio is greater than 1. Oxygen is present in the surface layers when it has this oxide layer, so assuming that cobalt was distributed uniformly within the particle, the amount of cobalt would be relatively less in the surface layers, so this ratio would be less than 1. With the magnetic particles according to the present invention, this ratio is sufficiently greater than 1 even when considering this oxygen in the surface layers.

The magnetic powder for magnetic recording medium comprising acicular particles constituted primarily of Fe according to the present invention is characterized in that the Co content of the particles when expressed as the Co/Fe ratio is 50 at. % or less, the Co is contained in a manner such that the surface portion has a higher concentration than the core portion of the particles and, upon subjecting the powder to TG measurement it exhibits at least two oxidation starting points: a low-temperature side oxidation starting point and a high-temperature side oxidation starting point. At this time, if the relationship between the low-temperature side oxidation starting point [apparent ignition temperature ($IT_{(i)}$)] and the high-temperature side oxidation starting point [actual ignition temperature ($IT_{(ii)}$)] is:

$$IT_{(ii)} - IT_{(i)} \geq 10° C.$$

or preferably ≥15° C., or more preferably ≥20° C., then it can have sufficient oxidation resistance while keeping its superior magnetic characteristics. If the difference between the two oxidation starting points is less than 10° C., this means that the formation of the oxidation-resistance layer is inadequate, so while its magnetic characteristics may be superior, it will have inadequate oxidation resistance. FIG. 1 graphically illustrates a typical example of the [apparent ignition temperature ($IT_{(i)}$)] and the [actual ignition temperature ($IT_{(ii)}$)] in TG measurement.

In TG measurement, the overall weight gain mainly due to oxygen seen from the start of oxidation up to 300° C. is 10 wt. % or more, preferably 15 wt. % or more. If the overall weight gain is less than 10 wt. %, this indicates that the oxygen content in the particles was originally high, or namely that a layer of a thick oxide layer had already been formed on the surface of the particles, and in this case, the volume of the magnetic particle core portion is relatively low, so adequate magnetic characteristics would not be obtained. Note that the average length of the major axis of the magnetic powder according to the present invention is 10-200 nm, or preferably 15-150 nm or even more preferably 20-100 nm. With an average length of the major axis less than 10 nm, an acicular particle shape is difficult to obtain and the shape magnetic anisotropy is difficult to attain. On the other hand, if the average length of the major axis is greater than 200 nm, this powder would not be suitable for high density magnetic recording medium and thus not preferable.

The magnetic powder according to the present invention that satisfies these conditions, even if it comprises fine particles where the average length of the major axis is less than 0.1 μm, the drop in saturation magnetization $\Delta\sigma_s$ when stored for one week under constant temperature and constant humidity at a temperature of 60° C. and humidity of 90% RH is less than 15%, or preferably less than 10%, so it has superior weatherability. This is provided that $\Delta\sigma_s$ is defined as:

$$\Delta\sigma_s = 100 \times [\sigma_{s(i)} - \sigma_{s(ii)}]/\sigma_{s(i)}.$$

Here, $\sigma_{s(i)}$ is the saturation magnetization prior to the storage under constant temperature and constant humidity and $\sigma_{s(ii)}$ is the saturation magnetization after one week of storage under the condition above.

Working examples will follow below, but we shall first describe the methods of evaluating the various characteristic values adopted in these working examples.

Lengths of the Major and Minor Axes of Particles

To measure the lengths of the major and minor axes, the field observed by a transmission electron microscope (JEOL 100CX Mark-II) is photographed at 174,000× magnification, and the average both lengths measured for 500 particles are given. The measurement was performed by excluding those particles that do not have distinct boundaries because of overlap in particles due to how the photograph was taken, and those with indistinct edges due to the edge of the photograph and such, so only those well-dispersed individual particles were measured.

Analysis of the Chemical Composition of the Particle Surface

The analysis of the chemical composition of the particle surface is performed by means of ESCA, or namely analysis using x-ray photoelectron spectroscopy (XPS). As the measurement conditions, an Ulvac Phi ESCA 5800 system was used, the x-ray source was a 150 W Al anode source, the surface area analyzed was 800 μm ϕ in diameter, a neutral gun was used, the takeout angle was set to 45° and the sample was placed upon a holder. The scanning speed was 5 eV/min and etching was performed at a rate of 2 nm/cycle when converted to $SiO_2$. The ranges measured at this time were as follows.

Fe (2p): 740-700 (eV)
Co (3s): 810-770 (eV)
Al (2p): 88-68 (eV)
Y (3d): 172-152 (eV)
O (1s): 545-525 (eV)

Analysis of the Chemical Composition of the Entire Particle

For the analysis of the chemical composition of the entire particle, Co, Al and Y were quantitatively analyzed using a Nippon Jarrel-Ash high-resolution inductively coupled plasma atomic emission spectrometer (IRIS/AP) (ICP), while Fe was quantitatively analyzed using a Hiranuma Automatic Titrator (COMTIME-980) from Hiranuma Sangyo Co., Ltd. and oxygen was quantitatively analyzed using a LECO Corporation Nitrogen/Oxygen Determinator (TC-436). The results of quantitative analysis are given as wt. %, so the calculation of the atom percent relative to Fe (at. %) is performed after first converting the proportion of all elements from wt. % to at. %.

Particle Surface Co/Fe Abundance Ratio

The measurement was performed without performing ion sputter of the particles, and their peak results were used to perform quantitative analysis of the abundance ratio of Co and Fe in the surface layers using the area analysis technique. The ratio of the amounts of Co and Fe present in the surface layer (indicated as ESCA Co/Fe) is obtained from the results obtained by converting the values thus obtained to amounts of atoms.

Magnetic Characteristics of the Powder

The magnetic characteristics of the powder were measured under a 796 kA/m (10 kOe) external magnetic field using a vibrating sample magnetometer (VSM-7P) made by Toei-Kogyo Co., Ltd.

Evaluation of the Oxidation Resistance of the Powder

The sample powder was stored for one week under constant temperature and constant humidity at a temperature of 60° C. and humidity of 90% RH, and the change in the saturation magnetization $\Delta\sigma_s$ before and after storage was calculated.

Powder pH

The powder pH is measured by a method based on JIS K 5101-1991. Specifically, 5 g of the sample is placed in a hard Erlenmeyer flask, 100 mL of deionized water is added and then it is brought to a boil by heating for approximately 5 minutes. After coming to a boil, the flask is stoppered and allowed to cool to room temperature, the stopper is opened and the amount of weight lost is replaced with water from which carbon dioxide is removed by boiling, thus accurately adjusting the value. Thereafter, the Erlenmeyer flask is stoppered and shaken for one minute and then left standing for five minutes. Thereafter, the pH of the aqueous suspension is measured according to JIS Z 8802.

Specific Surface Area

The specific surface area is calculated by the BET method using a Quadrasorb US system made by Yuasa Ionics Inc.

Crystallite Dx

Dx is found from the half-value width at the diffraction peak of the Fe(110) plane obtained with an x-ray diffractometer (Rigaku RAD-2C). Namely, it is found from a 2θ equation according to $D_{(110)} = K\lambda/\beta \cos\theta$ (where K is the Scherrer constant=0.9, λ is the wavelength of the incident x-rays, β is the half-value width at the diffraction peak: used to correct the radian diameter, and θ is the diffraction angle).

Tape Evaluation

A magnetic coating material is prepared by taking 100 parts by weight of the sample powder and blending with the following materials to obtain the indicated composition by weight, which is dispersed in a centrifugal ball mill for one hour. A base film made of polyethylene terephthalate is coated with the magnetic coating material thus obtained to prepare a magnetic tape. The coercivity $H_{cx}$ of the tape is measured and the SFDx value is calculated from its hysteresis curve. The magnetic characteristics of the magnetic tape are measured using the aforementioned VSM system at an external magnetic field of 796 kA/m (10 kOe).

| | | |
|---|---|---|
| Ferromagnetic iron alloy powder | 100 parts | (Powder obtained according to the various Examples in Table 2) |
| Polyurethane resin | 30 parts | (UR-8200 from Toyobo Co., Ltd.) |

-continued

| | |
|---|---|
| Polyvinyl chloride resin | 30 parts (MR-110 from Zeon Corp.) |
| Methyl ethyl ketone | 190 parts |
| Cyclohexane | 80 parts |
| Toluene | 110 parts |
| Stearic acid | 1 part |
| Acetyl acetone | 1 part |
| Alumina | 3 parts |
| Carbon black | 2 parts |

EXAMPLES

Example 1

A cake of iron oxy-hydroxide to be used as the nuclei grains was prepared. This iron oxy-hydroxide cake was formed by adding sodium carbonate to an aqueous solution containing iron and cobalt to produce iron carbonate and then passing an oxygen-containing gas (air) through this solution to oxidize and mature it. The powder of iron oxy-hydroxide particles within this cake had the following characteristics:
average length of the major axis=0.087 μm,
axial ratio=8.5,
specific surface area by the BET method=129.7 m²/g,
Co content=21.4 at. % as a Co/Fe atomic percent ratio,
[ESCA Co/Fe]/[ICP Co/Fe]=surface-layer Co/core Co=0.95.

This iron oxy-hydroxide cake was subjected to peptization and dispersion in water using a mixer (a homomixer made by Tokushu Kika Kogyo Co., Ltd.) at a speed of 5000 rpm for 10 minutes to obtain 1 L of slurry with a slurry density of 20 g/L.

The slurry thus obtained was placed in a bubble column and bubbles of nitrogen gas were introduced into the slurry at a flow rate of 40 L/minute to purge dissolved oxygen from the system. Then, while nitrogen was being passed through the slurry, 200 mL of a cobalt amine complex solution formed by dissolving extra-pure cobalt sulfate in an aqueous solution of 5% $NH_3$ was added to the slurry in such amount that the Co/Fe ratio in the composition of the final product of iron oxy-hydroxide would be 31.4 at. %, namely as to add Co to the iron oxy-hydroxide in an amount of 10 at. % as Co/Fe. At this time, the Co adhesion efficiency had been found to be roughly 75% as a result of preliminary experiments performed in advance, so the density of the solution used in adhesion was adjusted to a somewhat higher density in consideration of this fact. To wit, 3.55 g of extra-pure cobalt sulfate 7 hydrate reagent was placed in 200 mL of 5% ammonia water and mixed by stirring for 10 minutes at room temperature conditions.

Thereafter, 51.61 g of extra-pure anhydrous sodium carbonate (equivalent to a $CO_2$/(Fe+Co) atomic ratio of 2) was added. In order to relieve the effects of the heat generated by the dissolution of the carbonate at this time, the temperature of the solution was adjusted such that it did not rise above 20° C. Thereafter, blending while suppressing any increase in temperature was performed for 15 minutes to cover the surface of the iron oxy-hydroxide with a carbonate of cobalt, and then acetic acid was used to adjust the pH to 7.5 while maturation was performed at 35° C. for three hours.

After maturation, an aqueous solution of aluminum sulfate (3.76 g of anhydrous aluminum sulfate dissolved in 100 mL of deionized water) was added gradually to make Al/(Fe+Co)=8.9 at. %. Thereafter, ammonia water (23%) was added to increase the pH to 9.5 and maturation was performed until the temperature stabilized.

Then, a solution of yttrium oxide formed by dissolving 1.70 g of yttrium oxide in 100 mL of dilute sulfuric acid (this concentration is equivalent to Y/(Fe+Co)=6.2 at. %) was added at once to adhere Y to the surface of the iron oxy-hydroxide.

After the process of adhering Y, iron oxy-hydroxide with a two-layer structure was obtained by performing maturation for one hour. The iron oxy-hydroxide with a two-layer structure contained Co, Al and Y in the following ratios:
Co/Fe=30.6 at. %,
Al/(Co+Fe)=8.7 at. %, and
Y/(Co+Fe)=6.0 at. %,
and had the following characteristics:
average length of the major axis=0.095 μm,
axial ratio=8,
specific surface area by the BET method=118.3 m²/g,
Dx=127 Å.

These characteristic values are presented in Table 1, for both the starting material of the acicular nuclei/crystal iron oxy-hydroxide and the produced acicular iron oxy-hydroxide with a two-layer structure.

Examples 2-5

Iron oxy-hydroxides with a two-layer structure were obtained by repeating Example 1 except that the iron oxy-hydroxide used as the nuclei grains were changed to those having the composition listed in the "Acicular nuclei/crystal iron oxy-hydroxide characteristics" column of Table 1 for Examples 2-5. The characteristics of the acicular iron oxy-hydroxides with a two-layer structure thus obtained are similarly given in the "Acicular iron oxy-hydroxide characteristics" column of Table 1 in the same manner as in Example 1.

Example 6

A cake of iron oxy-hydroxide to be used as the nuclei grains was prepared. The physical properties of the particles contained in the cake are shown in the "acicular nuclei/crystal iron oxy-hydroxide characteristics" column of Table 1, but [ESCA Co/Fe]/[ICP Co/Fe]=surface-layer Co/core Co ratio=0.93. This iron oxy-hydroxide cake was subjected to uniform peptization in water using a homomixer made by Tokushu Kika Kogyo Co., Ltd. at a speed of 5000 rpm for 10 minutes to obtain 1 L of slurry with a slurry density of 20 g/L.

The slurry thus obtained was placed in a bubble column and bubbles of nitrogen gas were introduced into the slurry at a flow rate of 40 L/minute to purge dissolved oxygen from the system. Then, 200 mL of a cobalt ammine complex solution formed by dissolving 15.28 g of extra-pure cobalt sulfate 7 hydrate in an aqueous solution of 5% $NH_3$ was added to the slurry, and then the slurry was blended by stirring for 10 minutes at room temperature.

Thereafter, 56.23 g of extra-pure anhydrous sodium carbonate (the amount of this carbonate added is equivalent to a $CO_2$/(Fe+Co) atomic ratio of 2) was added. In order to relieve the effects of the heat generated by the dissolution of the carbonate at this time, the temperature of the solution was adjusted such that it does not rise above 20° C. Thereafter, blending while suppressing any increase in temperature was performed for 15 minutes to cover the surface of the iron oxy-hydroxide with a carbonate of iron/cobalt, and then acetic acid was used to adjust the pH to 7.5 while maturation was performed at 35° C. for three hours.

After maturation, oxidation was performed gradually by passing an oxygen-containing gas (air) through the solution, and once 30 minutes had elapsed from the start of oxidation, an aqueous solution of aluminum sulfate with its aluminum ion concentration adjusted so that Al/(Fe+Co)=8.5 at. % (3.86 g of anhydrous aluminum sulfate dissolved in 100 mL of deionized water) was added gradually (adjusted so that oxidation would end in the interval until an oxidation ratio of 85%). Thereafter, ammonia water (concentration of 23%) was added to adjust the pH to 9.5 and maturation was performed until the temperature stabilized. Then, a solution of yttrium oxide formed by dissolving 1.86 g of yttrium oxide in 100 mL of dilute sulfuric acid (this concentration is equivalent to Y/(Fe+Co)=6.2 at. %) was added at once to adhere Y to the surface of the iron oxy-hydroxide. After the process of adhering Y, iron oxy-hydroxide with a two-layer structure was obtained by performing maturation for one hour. The iron oxy-hydroxide with a two-layer structure had a composition such that, as shown in Table 1, Co/Fe=30.3 at. %, Al/(Co+Fe)=8.3 at. %, and Y/(Co+Fe)=6.0 at. %, and had the following characteristics: average length of the major axis=0.098 μm, axial ratio=7, BET value=114.3 m$^2$/g, and Dx=118 Å.

Example 7

The iron oxy-hydroxide with a two-layer structure obtained in Example 1 was heated at 475° C. for 30 minutes in an air atmosphere to obtain an iron oxide powder. The iron oxide powder thus obtained was placed in a stainless-steel boat, inserted into a quartz tube and loaded into an electric kiln, and subjected to thermal reduction while hydrogen gas was passed through the kiln at a flow rate of 50 L/min. During this reduction, the temperature was held at 500° C. for 15 minutes from the start of reduction, then raised at a heating rate of 1° C./min to 600° C. and then that temperature was held for 30 minutes. Thereafter, the reduced powder thus obtained was cooled in a nitrogen atmosphere to 70° C. and then kept at a temperature of 70° C. while an oxygen-containing gas with a nitrogen:oxygen ratio of 9:1 was passed through for 90 minutes at a rate of 55 L/min, thus forming an oxide layer on the surface of the reduced powder particles.

The acicular iron oxy-hydroxide thus obtained had a composition such that, as shown in Table 2,
Co/Fe=30.5 at. %,
Al/(Co+Fe)=8.7 at. %, and
Y/(Co+Fe)=6.1 at. %, and had the following characteristics: average length of the major axis=0.092 μm, axial ratio=6.8, coercivity H$_c$=202.9 kA/m (2549 Oe), saturation magnetization σ$_s$=163 Am$^2$/kg (163 emu/g), BET value=42 m$^2$/g, Δσ$_s$=5.3%, Dx=168 Å, powder pH=8.9 and [ESCA Co/Fe]/[ICP Co/Fe]=1.56. Table 3 presents the magnetic characteristics of a tape prepared using this acicular iron alloy powder.

Figure 2:
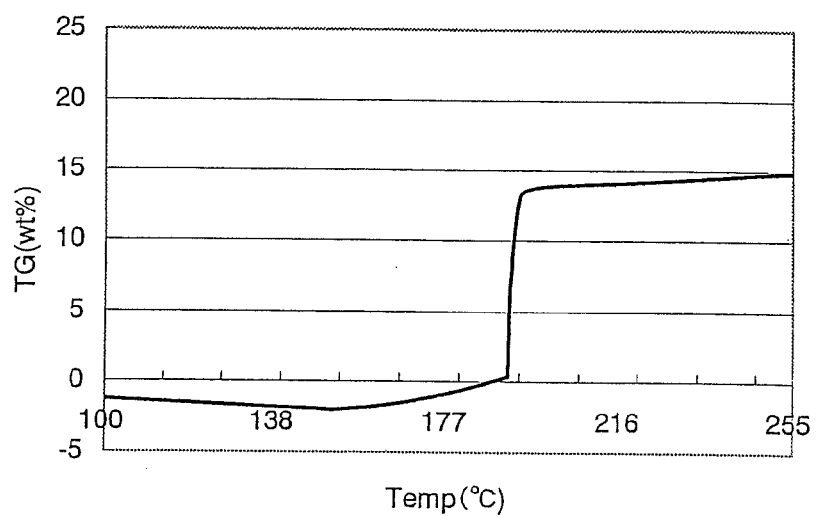
FIG. 2 is an example of a graph of the TG curve of magnetic powder according to the present invention.

In addition, when the acicular iron alloy powder thus obtained was subjected to TG measurement, as indicated by the TG curve shown in FIG. 2, it exhibited an apparent ignition temperature=142° C. and actual ignition temperature=189° C., and thus the difference between the actual ignition point and the apparent ignition point was 47° C. and the weight gain was 15.4 wt. %.

Examples 8-12

Example 7 was repeated except that the iron oxy-hydroxides with a two-layer structure obtained in Examples 2-6 were used. The characteristics of the acicular iron alloy powders thus obtained (Examples 8-12) are shown in Table 2. In addition, Table 3 presents the magnetic characteristics of tapes prepared using the various acicular iron alloy powders.

Comparative Example 1

2900 mL of a 0.15 mol/L aqueous solution of ferrous sulfate and 1300 mL of a 0.1 mol/L aqueous solution of cobalt sulfate were mixed such that the ratio of cobalt to iron becomes Co/Fe=30.4 at. %. Nitrogen was introduced at a flow rate of 25 L/minute to purge dissolved oxygen from the solution, and then sodium carbonate was added in an amount (namely 179.65 g) such that it is equivalent to 3 times the total amount of iron and cobalt in mole ratio, thus producing a suspension having iron carbonate as the principal component. Air was passed through this slurry to oxidize it and also during this oxidation process, aluminum sulfate was added gradually in an amount so as to make the ratio Al/(Fe+Co) becomes 8.6 at. % (to with, 8.31 g of anhydrous aluminum sulfate dissolved in 100 mL of deionized water). Thereafter, after maturation, a solution of yttrium oxide formed by dissolving 3.57 g of yttrium oxide in 100 mL of dilute sulfuric acid (this concentration is equivalent to Y/(Fe+Co)=5.6 at. %) was added, and after filtration, washing and drying, an iron oxy-hydroxide with the properties shown in Table 1 was obtained. This iron oxy-hydroxide was subjected to a cobalt addition procedure different from that of Example 1, so it did not have the two-layer structure in the previous Examples.

Comparative Examples 2-5

The same procedure as in Comparative Example 1 was repeated using the same reagents but the amounts used were varied to obtain iron oxy-hydroxides with the properties shown in Table 1 as Comparative Examples 2-5.

Comparative Example 6

The iron oxy-hydroxide obtained in Comparative Example 1 was placed in a stainless-steel boat, inserted into a quartz tube and loaded into an electric kiln, heated at 475° C. for 30 minutes in an air atmosphere to obtain iron oxide particles. Thermal reduction under heating was performed while hydrogen gas was passed through the kiln at a flow rate of 50 L/min. During this reduction, the temperature was held at 500° C. for 15 minutes from the start of reduction, then raised at a heating rate of 1° C./min to 600° C. and then that temperature was held for 30 minutes. Thereafter, the reduced powder thus obtained was cooled in a nitrogen atmosphere to 70° C. and then kept at a temperature of 70° C. while an oxygen-containing gas with a nitrogen:oxygen ratio of 9:1 was passed through for 90 minutes at a rate of 55 L/min, thus forming an oxide layer on the surface of the reduced powder.

The acicular iron oxy-hydroxide thus obtained had a composition such that, as shown in Table 2,
Co/Fe=30.1 at. %,
Al/(Co+Fe)=8.6 at. %, and
Y/(Co+Fe)=5.5 at. %, and had the following characteristics: average length of the major axis=0.097 μm, axial ratio=6.3, coercivity H$_c$=209.0 kA/m (2625 Oe), saturation magnetization σ$_s$=152 Am$^2$/kg (152 emu/g), BET value=47.3 m$^2$/g, Dx=173 Å, powder pH=9.2 and [ESCA Co/Fe]/[ICP Co/Fe]=1.02, and the Δσ$_s$=18.9% was higher. Table 3 presents the magnetic characteristics of a tape prepared using this acicular iron alloy powder.

Figure 3:
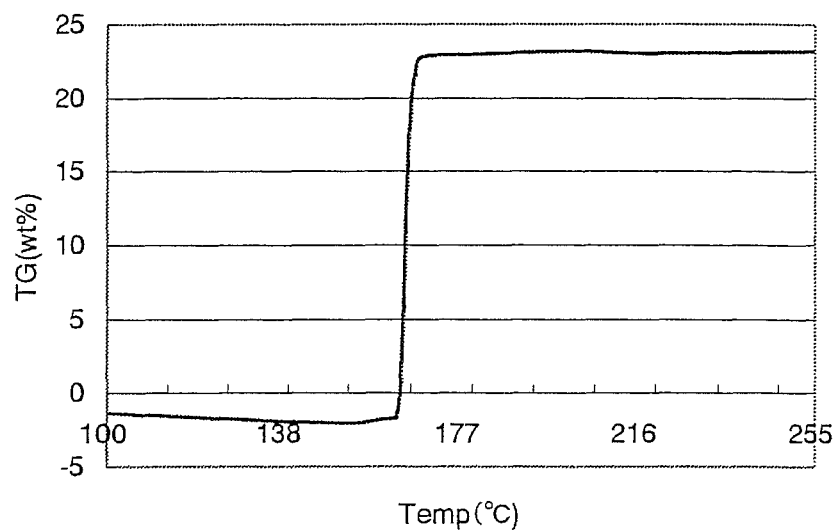
FIG. 3 is an example of a graph of the TG curve of magnetic powder according to a comparative example.

In addition, when the acicular iron alloy powder thus obtained was subjected to TG measurement, as indicated by the TG curve shown in FIG. 3, it oxidized with only a single start of oxidation (ignition temperature=163° C.) and the weight gain was 23.5 wt. %.

Comparative Examples 7-10

Comparative Example 6 was repeated except that the iron oxy-hydroxides obtained in Comparative Examples 2-5 were used. The characteristics of the acicular iron alloy powders thus obtained (Comparative Examples 7-10) are shown in Table 2. In addition, Table 3 presents the magnetic characteristics of tapes prepared using those acicular iron alloy powders.

Comparative Example 11

Comparative Example 6 was repeated except that, although the iron oxy-hydroxide obtained in Comparative Example 1 was used, after the end of reduction, it was cooled in a nitrogen atmosphere from the reduction temperature to 200° C. and at this temperature, an oxygen-containing gas with a nitrogen:oxygen ratio of 9:1 was passed through to change the surface to iron oxide.

The acicular iron oxy-hydroxide thus obtained had a composition such that, as shown in Table 2,
Co/Fe=30.2 at. %,
Al/(Co+Fe)=8.4 at. %, and
Y/(Co+Fe)=5.8 at. %, and had the following characteristics: average length of the major axis=0.095 μm, axial ratio=6.4, coercivity $H_c$=202.1 kA/m (2539 Oe), saturation magnetization $\sigma_s$=127 Am²/kg (127 emu/g), $\Delta\sigma_s$=4.9%, BET value=46.7 m²/g, Dx=185 Å, powder pH=9.2 and [ESCA Co/Fe]/[ICP Co/Fe]=0.78. Table 3 presents the magnetic characteristics of a tape prepared using this acicular iron alloy powder.

Figure 4:
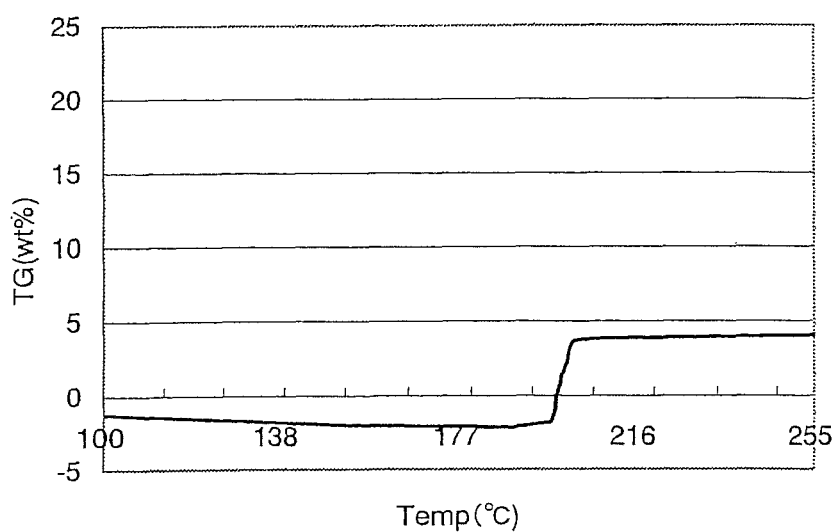
FIG. 4 is an example of a graph of the TG curve of magnetic powder according to another comparative example.

In addition, when the acicular iron alloy powder thus obtained was subjected to TG measurement, as indicated by the TG curve shown in FIG. 4, it oxidized with only a single start of oxidation (ignition temperature=192° C.) and the weight gain was 4.2 wt. %. From these experimental results, one can see that the acicular iron alloy powder according to this example has a thick oxide layer on the particle surface, and thus the weight gain is reduced. This is why the $\Delta\sigma_s$ was low at 4.9%, but the saturation magnetization $\sigma_s$ was low and the SFD value was high in the tape characteristics.

Comparative Examples 12-15

Comparative Example 11 was repeated except that the iron oxy-hydroxides obtained in Comparative Examples 2-5 were used. The characteristics of the acicular iron alloy powders thus obtained (Comparative Examples 12-15) are shown in Table 2. In addition, Table 3 presents the magnetic characteristics of tapes prepared using the various acicular iron alloy powders.

TABLE 1

| | Acicular nuclei/crystal iron oxy-hydroxide characteristics | | | | Acicular iron oxy-hydroxide characteristics | | | | | |
|---|---|---|---|---|---|---|---|---|---|---|
| | Powder properties | | | | | | | Powder properties | | |
| | Composition | Major | | | Composition | | | Major | | |
| | Co/Fe (at. %) | axis (μm) | Axial ratio | BET (m²/g) | Co/Fe (at. %) | Al/(Fe + Co) (at. %) | Y/(Fe + Co) (at. %) | Axis (μm) | Axial ratio | BET (m²/g) |
| Example 1 | 21.4 | 0.087 | 8.5 | 129.7 | 30.6 | 8.7 | 6.0 | 0.095 | 8.0 | 118.3 |
| Example 2 | 23.2 | 0.074 | 8.3 | 114.2 | 33.9 | 8.6 | 6.4 | 0.083 | 7.9 | 107.3 |
| Example 3 | 15.7 | 0.060 | 8.4 | 132.9 | 24.9 | 6.4 | 5.8 | 0.071 | 8.2 | 123.5 |
| Example 4 | 14.2 | 0.073 | 7.9 | 128.5 | 20.0 | 7.2 | 4.8 | 0.082 | 7.6 | 105.2 |
| Example 5 | 6.4 | 0.072 | 7.5 | 126.3 | 9.7 | 7.6 | 6.1 | 0.079 | 7.4 | 113.2 |
| Example 6 | 10.1 | 0.091 | 7.2 | 120.4 | 30.3 | 8.3 | 6.0 | 0.098 | 7.0 | 114.3 |
| Comparative Example 1 | | | | | 30.3 | 8.7 | 5.7 | 0.112 | 7.5 | 107.3 |
| Comparative Example 2 | | | | | 33.5 | 8.6 | 6.3 | 0.103 | 8.4 | 114.2 |
| Comparative Example 3 | | | | | 23.6 | 6.6 | 6.1 | 0.065 | 7.2 | 121.4 |
| Comparative Example 4 | | | | | 19.6 | 6.8 | 4.7 | 0.087 | 7.0 | 115.3 |
| Comparative Example 5 | | | | | 9.8 | 7.4 | 5.3 | 0.098 | 6.0 | 119.8 |

TABLE 2

| | | Characteristics of acicular iron alloy magnetic powders | | | | | | | | |
|---|---|---|---|---|---|---|---|---|---|---|
| | | | | | Powder characteristics | | | | | |
| | | Composition | | | | | | | | Co/Fe |
| | Iron oxy-hydroxide used | Co/Fe (at. %) | Al/ Fe + Co (at. %) | Y/Fe + Co (at. %) | Major axis (μm) | Axial ratio | BET (m²/g) | Dx (Å) | Powder pH | surface/ Co/Fe core |
| Example 7 | Example 1 | 30.5 | 8.7 | 6.1 | 0.092 | 6.8 | 42.0 | 168 | 8.9 | 1.56 |
| Example 8 | Example 2 | 34.0 | 8.8 | 6.2 | 0.078 | 7.8 | 45.3 | 147 | 8.7 | 1.63 |
| Example 9 | Example 3 | 24.7 | 6.3 | 5.9 | 0.064 | 7.4 | 56.3 | 132 | 8.8 | 1.42 |
| Example 10 | Example 4 | 20.3 | 6.9 | 4.9 | 0.078 | 7.6 | 51.8 | 173 | 9.3 | 1.35 |
| Example 11 | Example 5 | 9.5 | 7.4 | 5.3 | 0.076 | 7.3 | 57.5 | 136 | 9.2 | 1.23 |
| Example 12 | Example 6 | 30.2 | 8.3 | 6.2 | 0.094 | 6.7 | 43.9 | 174 | 8.6 | 1.89 |
| Comp. Example 6 | Comp. Example 1 | 30.1 | 8.6 | 5.5 | 0.097 | 6.3 | 47.3 | 173 | 9.2 | 1.02 |
| Comp. Example 7 | Comp. Example 2 | 33.4 | 8.9 | 6.4 | 0.081 | 8.3 | 50.6 | 158 | 9.8 | 1.01 |
| Comp. Example 8 | Comp. Example 3 | 23.8 | 6.5 | 6.0 | 0.063 | 7.5 | 63.4 | 142 | 9.6 | 1.05 |
| Comp. Example 9 | Comp. Example 4 | 19.8 | 6.7 | 4.8 | 0.083 | 7.2 | 58.9 | 183 | 9.7 | 1.09 |
| Comp. Example 10 | Comp. Example 5 | 9.7 | 7.2 | 5.4 | 0.072 | 6.2 | 62.4 | 140 | 9.4 | 1.02 |

TABLE 2-continued

| | | | | | | | | | |
|---|---|---|---|---|---|---|---|---|---|
| Comp. Example 11 | Comp. Example 1 | 30.2 | 8.4 | 5.8 | 0.095 | 6.4 | 46.7 | 185 | 9.2 | 0.78 |
| Comp. Example 12 | Comp. Example 2 | 34.2 | 8.7 | 5.9 | 0.078 | 8.6 | 49.8 | 174 | 10.3 | 0.82 |
| Comp. Example 13 | Comp. Example 3 | 24.3 | 6.4 | 6.3 | 0.065 | 6.9 | 62.5 | 153 | 9.3 | 0.74 |
| Comp. Example 14 | Comp. Example 4 | 20.4 | 6.7 | 4.9 | 0.081 | 7.3 | 60.3 | 193 | 9.4 | 0.80 |
| Comp. Example 15 | Comp. Example 5 | 9.3 | 7.3 | 5.0 | 0.074 | 5.8 | 63.2 | 152 | 9.3 | 0.71 |

| | | Characteristics of acicular iron alloy magnetic powders | | | | | | | |
|---|---|---|---|---|---|---|---|---|---|
| | | Magnetic properties | | | | TG | | | |
| | Iron oxy-hydroxide used | $H_c$ (kA/m) | $H_c$ (Oe) | $\sigma_s$ (Am$^2$/kg) | $\Delta\sigma_s$ (%) | Apparent ignition temp $IT_{(i)}$ (°C.) | Actual ignition temp $IT_{(ii)}$ (°C.) | Actual − Apparent (°C.) | Weight gain (wt %) |
| Example 7 | Example 1 | 202.9 | 2549 | 163 | 5.3 | 142 | 183 | 41 | 15.4 |
| Example 8 | Example 2 | 162.2 | 2037 | 152 | 8.2 | 147 | 189 | 42 | 16.9 |
| Example 9 | Example 3 | 192.9 | 2423 | 157 | 6.8 | 137 | 173 | 36 | 14.3 |
| Example 10 | Example 4 | 174.6 | 2193 | 141 | 4.7 | 129 | 189 | 60 | 10.6 |
| Example 11 | Example 5 | 157.2 | 1975 | 125 | 5.8 | 124 | 176 | 52 | 12.4 |
| Example 12 | Example 6 | 193.2 | 2427 | 142 | 4.3 | 138 | 197 | 59 | 14.2 |
| Comp. Example 6 | Comp. Example 1 | 209.0 | 2625 | 152 | 18.9 | — | 163 | 0 | 23.5 |
| Comp. Example 7 | Comp. Example 2 | 178.1 | 2237 | 140 | 15.2 | — | 148 | 0 | 24.3 |
| Comp. Example 8 | Comp. Example 3 | 198.5 | 2493 | 147 | 20.3 | — | 172 | 0 | 20.5 |
| Comp. Example 9 | Comp. Example 4 | 163.5 | 2053 | 136 | 16.8 | — | 137 | 0 | 17.9 |
| Comp. Example 10 | Comp. Example 5 | 153.1 | 1923 | 119 | 13.4 | — | 143 | 0 | 16.8 |
| Comp. Example 11 | Comp. Example 1 | 202.1 | 2539 | 127 | 4.9 | — | 192 | 0 | 3.7 |
| Comp. Example 12 | Comp. Example 2 | 160.4 | 2015 | 107 | 7.2 | — | 169 | 0 | 3.9 |
| Comp. Example 13 | Comp. Example 3 | 190.9 | 2398 | 104 | 6.2 | — | 186 | 0 | 4.3 |
| Comp. Example 14 | Comp. Example 4 | 163.0 | 2047 | 92 | 3.9 | — | 203 | 0 | 4.8 |
| Comp. Example 15 | Comp. Example 5 | 153.8 | 1932 | 83 | 4.4 | — | 194 | 0 | 3.5 |

TABLE 3

| | | Media properties | | | |
|---|---|---|---|---|---|
| | Iron oxy-hydroxide used | $H_c$ (kA/m) | $H_c$ (Oe) | SFDx | $\Delta B_m$ |
| Example 7 | Example 1 | 221.6 | 2783 | 0.32 | 3.2 |
| Example 8 | Example 2 | 178.4 | 2241 | 0.42 | 4.9 |
| Example 9 | Example 3 | 209.7 | 2634 | 0.45 | 3.7 |
| Example 10 | Example 4 | 186.5 | 2342 | 0.40 | 1.9 |
| Example 11 | Example 5 | 174.1 | 2187 | 0.39 | 3.7 |
| Example 12 | Example 6 | 214.8 | 2698 | 0.28 | 1.7 |
| Comp. Example 6 | Comp. Example 1 | 229.0 | 2876 | 0.41 | 10.2 |
| Comp. Example 7 | Comp. Example 2 | 196.4 | 2467 | 0.53 | 8.9 |
| Comp. Example 8 | Comp. Example 3 | 208.7 | 2621 | 0.56 | 13.4 |
| Comp. Example 9 | Comp. Example 4 | 177.9 | 2234 | 0.48 | 7.8 |
| Comp. Example 10 | Comp. Example 5 | 169.0 | 2123 | 0.47 | 6.4 |
| Comp. Example 11 | Comp. Example 1 | 213.1 | 2676 | 0.68 | 2.8 |
| Comp. Example 12 | Comp. Example 2 | 176.1 | 2212 | 0.64 | 4.2 |
| Comp. Example 13 | Comp. Example 3 | 202.6 | 2545 | 0.69 | 4.1 |
| Comp. Example 14 | Comp. Example 4 | 183.0 | 2298 | 0.72 | 1.8 |
| Comp. Example 15 | Comp. Example 5 | 162.7 | 2043 | 0.66 | 2.5 |

From the results shown in these Tables 1-3, one can see that the following holds true.

The acicular iron alloy powders obtained according to Examples 7-12 exhibit two oxidation starting points and thus have improved oxidation resistance in comparison with that of the powders according to Comparative Examples 6-10.

The acicular iron alloy powders obtained according to Examples 7-12 have a Co/Fe ratio in the surface layers of the particle that is relatively higher than its overall Co/Fe ratio, so both their oxidation resistance and magnetic characteristics are improved in comparison with those of the powders according to Comparative Examples 11-15.

If the weight gain at the time of TG measurement is less than 5.0 wt. % as in Comparative Examples 11-15, while the oxidation resistance is improved, the saturation magnetization $\sigma_s$ is a low value so good magnetic characteristics are difficult to obtain, but in contrast, the powders according to Examples 7-12 had high weight gains and adequate saturation magnetizations.

What is claimed is:

1. A method for producing a magnetic powder constituted primarily of Fe and containing Co, Al and a rare earth-element, including at least Y, which uses an iron oxy-hydroxide particle essentially consisting of Fe, Co, O, H and unavoidable impurities as a starting material, the method comprising:
   adding a carbonate and a Co amine complex to a slurry of the iron oxy-hydroxide particle and covering a surface of the iron oxyhydroxide particle with a carbonate of Co,
   adding Al salt to the slurry of the iron oxy-hydroxide particle and adhering Al to the surface of the iron oxy-hydroxide particle,
   adding a rare earth-element salt to the slurry of the iron oxy-hydroxide particle and adhering the rare earth-element, including at least Y, to the surface of the iron oxy-hydroxide particle,
   recovering an iron oxy-hydroxide particle on which surface Co, Al and the rare earth-element, including at least Y, are deposited,
   converting the recovered iron oxy-hydroxide particle to an iron oxide particle by thermal dehydration at a temperature range of 250 to 700 ° C.,
   reducing the iron oxide particle in a gas-phase to obtain an iron based alloy particle containing Co, Al and the rare earth-element, including at least Y, and
   gradually oxidizing the iron based alloy particle obtained by the gas-phase reduction process,
   wherein the magnetic powder constituted primarily of Fe contains Co in an amount such that a Co/Fe ratio is 50% or less, Co is contained such that a surface portion of the powder has a higher concentration than a core portion of the powder, and the core portion of the powder is substantially Fe-Co alloy containing Co in an amount such that a Co/Fe ratio is from 6.4 to 23.2 at. %.

2. The method for producing a magnetic powder according to claim 1, wherein the powder contains Al in an amount such that a Al/(Co+Fe) ratio is from 1 to 40 at. % and the rare earth-element, including at least Y, in an amount such that a rare earth/(Co+Fe) ratio is from 1 to 20 at. %.

3. The method for producing a magnetic powder according to claim 1, wherein an average length of a major axis thereof is 10-200 nm.

4. The method for producing a magnetic powder according to claim 1, wherein a relationship between an apparent ignition temperature ($IT_{(i)}$) and an actual ignition temperature ($IT_{(ii)}$) is as follows:

$$IT_{(ii)} - IT_{(i)} > 10° C.$$

* * * * *